(12) United States Patent
Jeran

(10) Patent No.: US 9,746,799 B2
(45) Date of Patent: *Aug. 29, 2017

(54) IMAGING SUPPLY MEMORY

(71) Applicant: HEWLETT-PACKARD DEVELOPMENT COMPANY, L.P., Houston, TX (US)

(72) Inventor: Paul Jeran, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,279

(22) Filed: Feb. 15, 2017

(65) Prior Publication Data

US 2017/0160671 A1 Jun. 8, 2017

Related U.S. Application Data

(63) Continuation of application No. PCT/US2015/043248, filed on Jul. 31, 2015.

(51) Int. Cl.
*G03G 15/00* (2006.01)
*G03G 15/08* (2006.01)

(52) U.S. Cl.
CPC ................ *G03G 15/0863* (2013.01)

(58) Field of Classification Search
CPC ............ G03G 15/50; G03G 15/0867; G03G 15/0863; H04N 1/00832; H04N 1/00877; H04N 1/0097
USPC .......................................................... 399/83
See application file for complete search history.

(56) References Cited

U.S. PATENT DOCUMENTS

| 4,670,857 | A | 6/1987 | Rackman |
| 6,325,495 | B1 | 12/2001 | Foth |
| 6,738,903 | B1* | 5/2004 | Haines ................. B41J 2/17509 399/12 |
| 7,399,047 | B2 | 7/2008 | Ward et al. |
| 7,809,287 | B2* | 10/2010 | Okamura ............... G03G 15/55 399/111 |
| 7,970,292 | B2* | 6/2011 | Kim .................... G03G 15/0832 399/109 |
| 8,332,934 | B2* | 12/2012 | Lee .................... G03G 15/5066 713/151 |
| 8,351,802 | B2* | 1/2013 | Sonoda .................. G03G 15/55 399/12 |
| 8,370,260 | B2 | 2/2013 | Walmsley et al. |
| 9,304,435 | B2* | 4/2016 | Thacker ............... G03G 15/556 |
| 9,495,549 | B2* | 11/2016 | Refstrup ............ G03G 15/0863 |
| 2002/0171703 | A1 | 11/2002 | Phillips et al. |

(Continued)

FOREIGN PATENT DOCUMENTS

EP 0720916 7/1996
WO WO-2009145774 12/2009

(Continued)

*Primary Examiner* — Susan Lee
(74) *Attorney, Agent, or Firm* — Dierker & Kavanaugh, P.C.

(57) ABSTRACT

In one example, an article for an imaging supply for a printer that includes a first memory and a second memory in which the first memory stores an indication that unsigned data or signed data is stored on the second memory and the second memory stores consumables management data to cause the printer to define at least one of a yield, a low point, and an out point of the imaging supply.

22 Claims, 5 Drawing Sheets

(56) References Cited

U.S. PATENT DOCUMENTS

| | | | |
|---|---|---|---|
| 2003/0229777 A1* | 12/2003 | Morais | G06F 21/575 |
| | | | 713/2 |
| 2004/0067070 A1* | 4/2004 | Ito | G03G 15/553 |
| | | | 399/27 |
| 2005/0078165 A1 | 4/2005 | Harada et al. | |
| 2008/0212984 A1* | 9/2008 | Sasaki | G03G 15/553 |
| | | | 399/24 |
| 2012/0219305 A1* | 8/2012 | Fei | G03G 15/556 |
| | | | 399/12 |
| 2013/0039667 A1* | 2/2013 | Osawa | G03G 21/1889 |
| | | | 399/12 |
| 2013/0321853 A1* | 12/2013 | Lee | G03G 21/1882 |
| | | | 358/1.14 |
| 2015/0261181 A1* | 9/2015 | Moon | G03G 21/1871 |
| | | | 399/90 |

FOREIGN PATENT DOCUMENTS

| WO | WO-2014163638 | 10/2014 |
|---|---|---|
| WO | WO-2015016863 | 2/2015 |
| WO | WO-2015016881 | 2/2015 |

\* cited by examiner

IMAGING SUPPLY MEMORY

CROSS REFERENCE TO RELATED APPLICATIONS

This is a continuation of international application serial no. PCT/US2015/043248 filed Jul. 31, 2015, which is incorporated herein by reference in its entirety.

BACKGROUND

Some printers are designed to use imaging supplies that are included on a list of supported imaging supplies stored on the printer. In such examples, if an imaging supply is inserted into the printer, the printer reads a model type and/or identifier from the imaging supply and then determines if the model type and/or identifier is included on a list of supported imaging supplies stored on the printer. If the printer determines that the inserted imaging supply is a non-supported imaging supply, the printer may not use the non-supported imaging supply for printing procedures.

DRAWINGS

The figures are not to scale. Wherever possible, the same reference numbers will be used throughout the drawing(s) and accompanying written description to refer to the same or like parts.

DESCRIPTION

Figure 1:
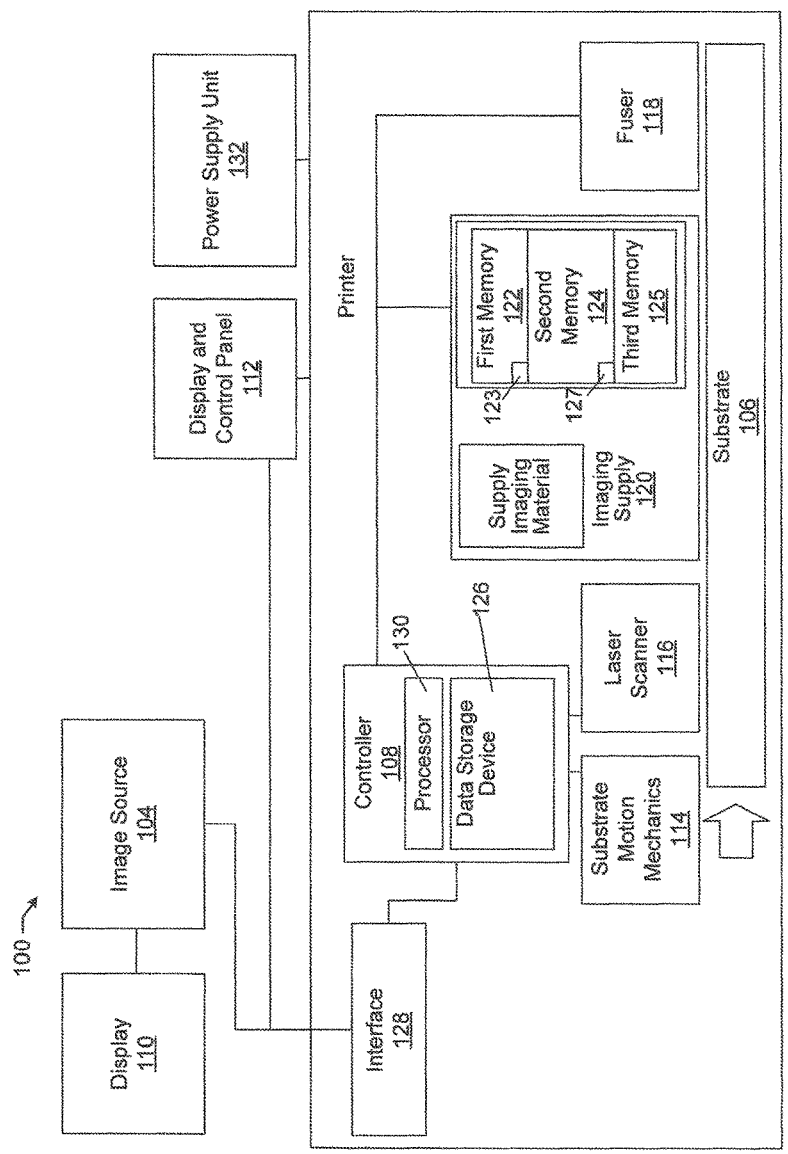
FIG. 1 is a schematic illustration of an example printer that can be used to implement the examples disclosed herein.

The examples disclosed herein relate to imaging supplies including data and/or information that, when inserted and/or coupled to an example printer, dynamically define how the example printer interacts with the example imaging supplies and/or dynamically define which imaging supplies are compatible with the example printer. The imaging supplies may include ink cartridges, toner cartridges, tanks and/or any container and/or replaceable device that holds printing material (e.g., ink, dye, toner, etc.) to form or fix an image on media (e.g., a substrate).

In some examples, the example data and/or information stored on the example imaging supplies cause the example printer to update compatible-imaging supplies data and/or supported-imaging supplies data stored on the printer. When the information (e.g., data) cause the example printer to update the compatible-imaging supplies data, the information (e.g., data) may be considered signed data. As set forth herein, signed data may contain a security module and/or a digital signature that the printer uses to authenticate the imaging supply and/or that the printer uses to authenticate the modification of the compatible-imaging supplies data of the example printer. In some examples, an indication (e.g., a flag) of the presence of signed data is stored on a first memory on the imaging supply and other information (e.g., data) such as information (e.g., data) that cause the example printer to update the compatible-imaging supplies data are stored on a second memory on the imaging supply.

In some examples, when an imaging supply including signed data (e.g., an authenticated imaging supply) is inserted into and/or coupled to an example printer, the printer interacts with the example imaging supply to obtain, access and/or read the information (e.g., e.g., data) stored on the inserted imaging supply and updates the compatible-imaging supplies data. In some examples, the information (e.g., data) stored on the authenticated imaging supply cause the printer to add at least one imaging supply to the compatible-imaging supplies data stored by the printer. The added imaging supply identifier may be the same as or different from the imaging supply identifier of the inserted imaging supply (e.g., the first imaging supply is different than the second imaging supply, the first imaging supply is the same as the second imaging supply). That is, an inserted imaging supply that was not on the list previously may add itself to the list, provided that the inserted imaging supply includes signed data. In some examples when the added imaging supply is different than the inserted imaging supply, the added imaging supply may have at least one of a different part number from the inserted imaging supply, a different imaging supply identifier from the imaging supply identifier of the inserted imaging supply, a different yield than the inserted imaging supply, a different color than the inserted imaging supply, a different capacity than the inserted imaging supply, a different chemical property than the inserted imaging supply, be a different size than the inserted imaging supply, etc. In some examples, the information (e.g., data) stored on the authenticated imaging supply cause the printer to remove at least one imaging supply identifier from the compatible-imaging supplies data stored on the printer.

In some examples, the information (e.g., data) stored on the authenticated imaging supply cause the printer to facilitate (e.g., enable) the inserted imaging supply to be used by the printer (e.g., one time use) even though the inserted imaging supply is not included in and/or listed on the compatible-imaging supplies data. For example, if a company chooses to produce imaging supplies for a contract customer (e.g., contract imaging supplies) that contain a different quantity of supply material (e.g., ink, dye, toner, etc.) than imaging supplies that are included in and/or listed on the compatible-imaging supplies data, the examples disclosed herein may facilitate example printers to use these authenticated imaging supplies even though these authenticated imaging supplies are not included in and/or listed on the compatible-imaging supplies data stored by the printer. In some examples, an indication of the presence of signed data is stored on a first memory on the imaging supply and other information (e.g., data) such as information (e.g., data) that cause the example printer to use an inserted imaging supply even though the inserted imaging supply is not included and/or listed on the compatible-imaging supplies data are stored on a second memory on the imaging supply.

In some examples, the example information (e.g., data) stored on the example imaging supplies dynamically define how the example printer interacts with the example imaging supplies when such example imaging supplies are used with the example printers. In some such examples, the information (e.g., data) may be signed data and/or unsigned data. As set forth herein, unsigned data do not contain a security module and/or may not include a digital signature that authenticates the imaging supply. In some examples, imaging supplies including unsigned data are not authorized to modify the compatible-imaging supplies data stored on the printer. However, while these imaging supplies including unsigned data may not be authorized to modify the compatible-imaging supplies data, the example printers disclosed herein may facilitate these imaging supplies including unsigned data to be used by the example printers and/or may facilitate these imaging supplies including unsigned data to dynamically define how the example printer interacts with these imaging supplies. In some examples, when an imaging supply including unsigned data is inserted into and/or coupled to the example printer, the example printer may cause authorization (e.g., user authorization) to be obtained prior to the printer using the unsigned data.

In some examples, when an imaging supply including signed and/or unsigned data is inserted and/or coupled to an example printer, the printer interacts with the example imaging supply to obtain, access and/or read the information (e.g., data) stored on the inserted imaging supply and the printer updates consumables management data associated with the inserted imaging supply and stored on the printer accordingly. In some examples, the consumables management data relate to the yield and/or the number of pages the inserted imaging supply can print during its usable life. In some such examples, the yield data stored on the inserted imaging supply are used by the printer to create a consumables gauge and/or consumables tracking information that is displayable to a user and/or is used by the printer in combination with life tracking processes stored on the printer. In some examples, an indication of the presence of signed and/or unsigned data is stored on a first memory on the imaging supply and other information (e.g., data) such as information (e.g., data) that cause the printer to dynamically define how the printer interacts with the inserted imaging supplies is stored on a second memory on the imaging supply.

In some examples, the data stored in a second memory on the imaging supply relates to color management data. In some examples, the color management data is used by the printer to cause the imaging supply to dispense or develop a particular amount of supply material and/or a particular combination of supply materials (e.g., cyan supply material and yellow supply material) to render a desired color. In some examples, the color management data is used by the printer to cause components of the printer and/or components of the inserted imaging supply to function in a particular manner. For example, in some examples, data of the imaging supply is used by the printer to cause a fuser of the printer to be heated to a threshold temperature and/or a particular temperature and/or to cause the fuser to heat to the threshold temperature within a given time frame and/or for the fuser to have a temperature profile and/or behavior.

In some examples, the first memory of the imaging supply includes an indication that the second memory contains limited or no data (e.g., no signed data is present, no unsigned present). In such examples, the inserted imaging supply does not include information (e.g., data) that, for example, dynamically define how the example printer interacts with the inserted imaging supplies. Because, for example, such imaging supplies may not include consumables management data, no consumables tracking information and/or no consumables gauge may be displayable when such imaging supplies are used. In some such examples, when an imaging supply including no data is inserted into and/or coupled to the example printer, the example printer may cause authorization (e.g., user authorization) to be obtained prior to the printer using the inserted imaging supply. In examples in which no data is present on the imaging supply, the printer uses default settings stored on the printer when performing operations (e.g., default setting for the fuser temperature, etc.) using the inserted imaging supply.

FIG. 1 is a block diagram of an example printer 100 that can be used to implement the teachings of this disclosure. The example printer 100 of FIG. 1 includes an example image source 104 and an example substrate 106 (e.g., paper). The image source 104 may be a computing device from which the printer 100 receives data describing a print job to be executed by an example controller 108 of the printer 100 to print an image on the substrate 106. In this example, to facilitate information such as imaging supply consumables information to be displayed to a user, the image source 104 is coupled to an example display 110 and the printer 100 is coupled to a display and control panel 112.

In the example of FIG. 1, the printer 100 also includes example substrate motion mechanics 114. In some examples, the substrate motion mechanics 114 include mechanical devices that move the substrate 106 when printing an image on the substrate 106. According to the illustrated example, information (e.g., data) to move the substrate 106 are received and processed by the example controller 108 (e.g., from the image source 104). In some examples, signals may be sent to the substrate motion mechanics 114 from the controller 108. In this example, an example laser scanner 116, an example fuser 118 and an example toner reservoir and/or imaging supply 120 are coupled to the controller 108. In some examples, the imaging supply 120 includes more than one toner cartridge and/or supply. In this example, the imaging supply 120 includes a first memory and/or flag 122, a second memory 124 and a third memory 125. In some examples, the first, second and/or memories 122 and 124 and/or the first, second and/or third 122, 124, 125 are different memories on the imaging supply 120. For example, when the first and second memories 122 and 124 are different memories, the first and second memories 122 and 124 may have one or more of different sizes, different lengths, different properties, different materials, different capacities, different data, etc. In some examples when the first and second memories 122 and 124 are different memories, the first and second memories 122, 124 are physically the same or similar, but are two separate elements (e.g., two different memories having the same part number and/or having the same characteristics but being physically separate). In some examples, the first, second and/or third memories 122, 124, 125 are coupled and/or are the same memory (e.g., the first memory is the same as the second memory). In some examples when the first and second memories 122, 124 are the same memories, the first and second portions 123, 127 are on the same memory and/or the first and second portions 123, 127 are combined.

In some examples, the first memory 122 includes an indicator (e.g., 0, 1, 2) stored in a first portion 123 of the first memory 122. In some examples, the indicator indicates the type of data contained on a second portion 127 of the second memory 124. In some examples, the indicator on the first portion 123 indicates that signed data is present on the second portion 127 of the second memory 124, that unsigned data are present on the second portion 127 of the second memory 124 and/or that limited or no data is present on the second portion 127 of the second memory 124. In some examples, signed data may contain a security module and/or a digital signature that authenticates the data in the second portion 127 of the second memory 124 within the imaging supply 120. In some examples, unsigned data may not contain a security module and/or may not include a digital signature that authenticates the use of the data in the second portion 127 of the second memory 124 within the imaging supply 120. In some examples, the second memory 124 includes information (e.g., data) that dynamically defines how the example printer 100 interacts with the example imaging supply 120 and/or dynamically defines which imaging supplies are compatible with the example printer 100. In some examples, the third memory 125 includes data and/or information including an imaging-supply identifier. In some examples, the third memory 125 includes additional data, such as, for example, developer parameters, cartridge life information (e.g., data), cartridge usage information (e.g. data), etc. In some examples, the imaging-supply identifier identifies the model-type of the imaging supply.

The example printer 100 of FIG. 1 includes an interface 128 to interface with the image source 104 and/or to interface with the display and control panel 112. The interface 128 may be a wired or wireless connection connecting the printer 100 and the image source 104 and/or connecting the printer 100 and the display and control panel 112. The image source 104 may be a computing device from which the printer 100 receives data describing a print job to be executed by the controller 108. The display and control panel 112 may be an input and/or display device that provides input to the printer 100 and/or displays data from the printer 100. In some examples, the interface 128 facilitates the printer 100 and/or a processor 130 to interface with various hardware elements, such as the image source 104 and/or hardware elements that are external and/or internal to the printer 100. In some examples, the interface 128 interfaces with an input or output device, such as, for example, a display device, a mouse, a keyboard, etc. The interface 128 may also provide access to other external devices such as an external storage device, network devices, such as, for example, servers, switches, routers, client devices, other types of computing devices and/or combinations thereof.

The example controller 108 includes the example processor 130, including hardware architecture, to retrieve and execute executable code (e.g., data) from the first memory 122, the second memory 124, the third memory 125 and/or the data storage device 126. The executable code, information (e.g., data) may, when executed by the example processor 130, cause the processor 130 to implement at least the functionality of controlling the substrate motions mechanics 114, the laser scanner 116, the fuser 118 and/or the imaging supply 120 to cause an image to be formed on the substrate 106. In some examples, the functionality of the substrate motion mechanics 114 includes moving the substrate 106 through the printer 100, the functionality of the laser scanner 116 includes causing the imaging supply 120 to deposit supply material (e.g., toner) onto the substrate 106. In some examples, the functionality of the fuser 118 includes providing heat that heats the supply material (e.g., toner) on the substrate 106 to fuse the supply material to the substrate 106. The executable code, information (e.g., data) may, when executed by the example processor 130, cause the processor 130 to provide information (e.g., data) to a power supply unit 132, to cause the power supply unit 132 to provide power to the fuser 118 to create a temperature profile to fuse the supply material to the substrate 106.

In some examples when the first memory 122 includes a flag indicating that the second memory 124 includes signed data (e.g., authenticated data), the executable code may, when executed by the example processor 130, cause the processor 130 to add at least one imaging supply identifier to compatible-imaging supplies data stored on the data storage device 126. In some examples when the first memory 122 includes a flag indicating that the second memory 124 includes signed data (e.g., authenticated data), the executable code may, when executed by the example processor 130, cause the processor 130 to remove at least one imaging supply identifier from the compatible-imaging supplies data stored on the data storage device 126. In some examples, the compatible-imaging supplies data identify and/or list imaging supplies that are usable by the printer 100 and/or that are compatible with the printer 100.

In some examples when the first memory 122 includes a flag indicating that the second memory 124 includes signed data (e.g., authenticated data), the executable code may, when executed by the example processor 130, facilitate the processor 130 to use the imaging supply 120 even if the imaging supply 120 is not included and/or identified in the compatible-imaging supplies data. For example, if the imaging supply 120 is an imaging supply supplied to a customer on a contract basis (e.g., contract imaging supply), the manufacturer of the printer 100 and/or the manufacturer of the imaging supply 120 may intend that the imaging supply 120 be used by the printer 100 without having the imaging supply 120 included on the compatible-imaging supplies data.

In some examples when the first memory 122 includes a flag indicating that the second memory 124 includes signed data (e.g., authenticated data) and/or unsigned data (e.g., unauthenticated data), the executable code may, when executed by the example processor 130, facilitate the processor 130 to dynamically define how the printer 100 interacts with the imaging supply 120 and/or dynamically define consumable management data associated with the imaging supply 120.

In some examples in which the imaging supply 120 includes unsigned data, the executable code may, when executed by the example processor 130, cause the processor 130 to prompt and/or receive authorization from, for example, a user based on input obtained by the display 110 and/or the image source 104. In some examples, the authorization is indicative that the user accepts the risks associated with using the imaging supply 120 including unsigned data.

In some examples, the consumables management data may define the yield of the imaging supply, how a consumables gauge is created and/or defined, such as, for example, indicating that the imaging supply contents are low or out. In some examples when the executable code includes color management data, the executable code may, when executed by the example processor 130, cause the imaging supply 120 to dispense a particular amount of imaging material(s) (e.g., ink, toner, etc.) to render a desired color on the substrate 106, to heat a component (e.g., the fuser 118) of the printer 100 to a threshold temperature and/or to heat the component (e.g., the fuser 118) to the threshold temperature at a threshold rate and/or within a threshold time frame.

In some examples when the first memory 122 includes a flag indicating that the second memory 124 includes limited or no data (e.g., no color management data), the executable code may, when executed by the example processor 130, facilitate the processor 130 to use the imaging supply 120 in a default "safe" mode even if the imaging supply 120 includes limited or no data. In some examples in which the imaging supply 120 includes limited or no data, the executable code may, when executed by the example processor 130, cause the processor 130 to prompt and/or receive authorization to use the imaging supply 120 including limited or no data. In some examples, the authorization indicates that the user accepts the risks associated with using the imaging supply 120 including limited or no data.

In some examples, when the second memory 124 includes limited or no data, no executable code may be present on the imaging supply 120 that dynamically defines how the printer 100 interacts with the imaging supply 120. In some examples, if the second memory 124 includes limited or no data, the processor 130 may use executable code stored on the data storage device 126 that may, when executed by the example processor 130, facilitate the processor 130 to heat a component (e.g., the fuser 118) of the printer 100 to a threshold default temperature and/or to heat the component (e.g., the fuser 118) to the threshold default temperature at a threshold default rate and/or within a threshold default time frame. In some examples, if the second memory 124 includes limited or no data (e.g., no consumables management data), the printer 100 may be unable to cause a consumables gauge to be displayed on the display 110 and/or the display and control panel 112, for example.

The data storage device 126 of FIG. 1 stores information (e.g., data) that are executed by the example processor 130 or other processing devices. The example data storage device 126 may store computer code representing a number of applications, firmware, machine readable instructions, etc. that the example processor 130 executes to implement the examples disclosed herein.

While an example manner of implementing the printer is illustrated in FIG. 1, at least one of the elements, processes and/or devices illustrated in FIG. 1 may be combined, divided, re-arranged, omitted, eliminated and/or implemented in any other way. Further, the example image source 104, the example controller 108, the example display 110, the example display and control panel 112, the example substrate motion mechanics 114, the example laser scanner 116, the example fuser 118, the example imaging supply 120, the example first memory 122, the example second memory 124, the example third memory 125, the example data storage device 126, the example interface 128, the example processor 130, the example power supply 132, and/or, more generally, the example printer 100 of FIG. 1 may be implemented by hardware, software, firmware and/or any combination of hardware, software and/or firmware. Thus, for example, any of the example image source 104, the example controller 108, the example display 110, the example display and control panel 112, the example substrate motion mechanics 114, the example laser scanner 116, the example fuser 118, the example imaging supply 120, the example first memory 122, the example second memory 124, the example third memory 125, the example data storage device 126, the example interface 128, the example processor 130, the example power supply 132 and/or, more generally, the example printer 100 could be implemented by at least one of circuit(s), programmable processor(s), application specific integrated circuit(s) (ASIC(s)), programmable logic device(s) (PLD(s)) and/or field programmable logic device(s) (FPLD(s)), etc.

When reading any of the apparatus or system claims of this disclosure to cover a purely software and/or firmware implementation, at least one of the example image source 104, the example controller 108, the example display 110, the example display and control panel 112, the example substrate motion mechanics 114, the example laser scanner 116, the example fuser 118, the example imaging supply 120, the example first memory 122, the example second memory 124, the example third memory 125, the example data storage device 126, the example interface 128, the example processor 130, the example power supply 132 and/or the example printer 100 are hereby expressly defined to include a tangible computer readable storage device or storage disc such as a memory, DVD, CD, Blu-ray, etc. storing the software and/or firmware. Further still, the example printer 100 of FIG. 1 may include at least one of elements, processes and/or devices in addition to, or instead of, those illustrated and/or may include more than one of any or all of the illustrated elements, processes and devices.

Figure 2:
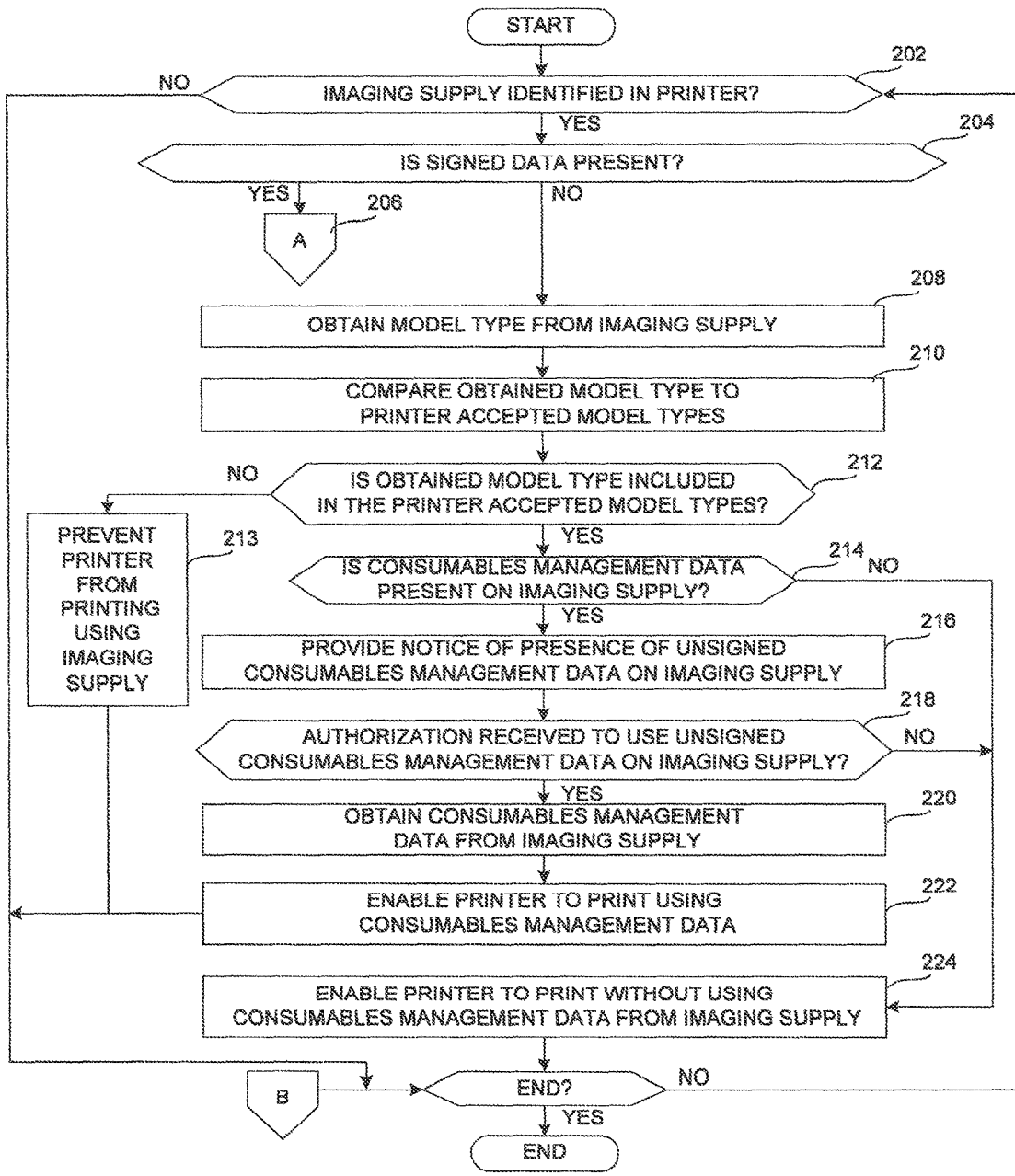
FIGS. 2 and 3 are example flowcharts representative of machine readable instructions that may be executed to the implement the example printer of FIG. 1.
Figure 3:
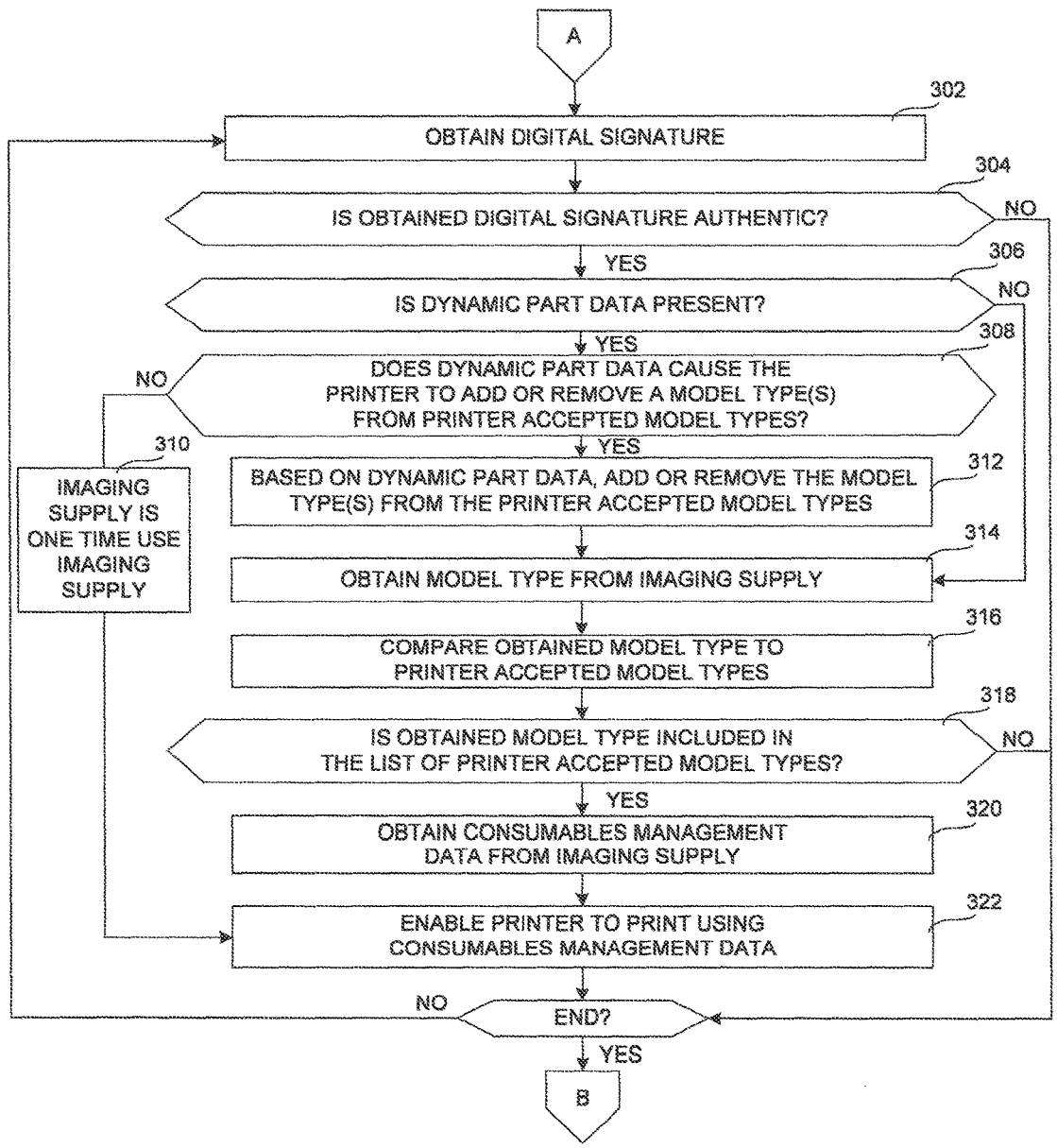
Figure 4:
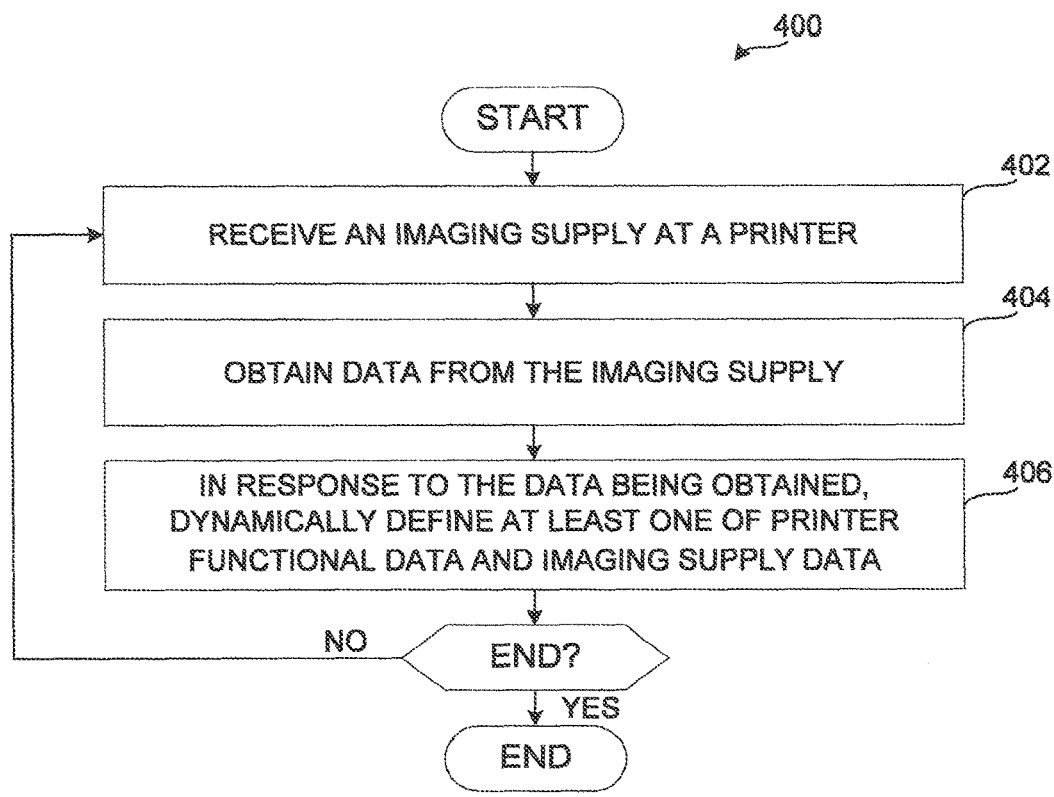
FIG. 4 is an example flowchart representative of machine readable instructions that may be executed to the implement the example printer of FIG. 1.

A flowchart representative of example machine readable instructions for implementing the printer 100 of FIG. 1 is shown in FIGS. 2, 3 and 4. In this example, the machine readable instructions comprise a program for execution by a processor such as the processor 130 and/or the processor 512 shown in the example processor platform 500 discussed below in connection with FIG. 5. The program may be implemented in software stored on a tangible computer readable storage medium such as a CD-ROM, a floppy disk, a hard drive, a digital versatile disk (DVD), a Blu-ray disk, or a memory associated with the processor 130, 512, but the entire program and/or parts thereof could alternatively be executed by a device other than the processor 130, 512 and/or implemented in firmware or dedicated hardware. Further, although the example program is described with reference to the flowcharts illustrated in FIGS. 2, 3 and 4, many other methods of implementing the example printer 100 may alternatively be used. For example, the order of execution of the blocks may be changed, and/or some of the blocks described may be changed, eliminated, or combined.

As mentioned above, the example processes of FIGS. 2, 3 and 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 2, 3 and 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

The program of FIG. 2 begins by the program identifying an imaging supply within the printer (block 202) by, for example, the imaging supply 120 being inserted into and/or coupled to the printer 100 and the controller 108 and/or the processor 130 identifying the presence of the imaging supply 120. The program determines if signed data are present on the imaging supply (block 204) by, for example, the processor 130 interacting with the example imaging supply 120 to obtain, access and/or read the instructions (e.g., data) stored on the first memory 122 to determine if the imaging supply 120 contains signed data stored on the imaging supply 120. If signed data are present on the imaging supply, the program advances to the processes disclosed in FIG. 3 (block 206). The instructions executed by the printer 100 may be stored on the first memory 122, the second memory 124, the third memory 125 and/or the data storage device 126.

However, if no signed data are present on the imaging supply (e.g., unsigned data), the program obtains a model type from the imaging supply (block 208) by, for example, the processor 130 interacting with the example imaging supply 120 to obtain, access and/or read the instructions (e.g., data) stored on the third memory 125 to obtain the model type and/or another identifier (e.g., the imaging supply identifier) of the imaging supply 120. The obtained model type is compared to printer accepted model types (block 210) by, for example, the processor 130 comparing the obtained model and/or the imaging supply type to compatible-imaging supplies data stored at, for example, the data storage device 126. The program determines if the obtained model type is one of the printer accepted model types (block 212) by, for example, the processor 130 determining if the obtained model and/or the imaging supply type is included in the compatible-imaging supplies data. In some examples, if the obtained model type is not one of the printer accepted model types, the program prevents the printer from using the imaging supply during a printing operation (block 213) by, for example, the processor 130 causing the printer 100 to not use the imaging supply 120 during a printing operation and/or the processor 130 causing an error message to be displayed at the display 110 and/or the display and control panel 112.

The program determines if consumables management data are included on the imaging supply (block 214) by, for example, the processor 130 interacting with the example imaging supply 120 to obtain, access and/or read the information (e.g., data) stored on the second memory 124 to determine if the imaging supply 120 includes consumables management data. In some examples, the consumables management data relates to color management data, the yield of the imaging supply 120 and/or the number of pages the imaging supply can print 120 during its usable life.

If consumables management data are present on the imaging supply, a notice is provided of the presence of unsigned consumables management data (block 216) by, for example, the processor 130 causing the image source 104, the display 110 and/or the display and control panel 112 to provide notice to a user relating to the risks associated with using the imaging supply 120 including unsigned data, for example. The program determines if authorization is received to use the unsigned consumables management data (block 218) by, for example, the processor 130 and/or the printer 100 interacting with the image source 104, the display 110 and/or the display and control panel 112 and receiving input indicative of authorization being obtained to use the unsigned consumables management data.

If authorization is obtained to use the unsigned consumables management data, the consumables management data is obtained from the imaging supply (block 220) by, for example, the processor 130 interacting with the example imaging supply 120 to obtain, access and/or read the information (e.g., data) stored on the second memory 124 to obtain the unsigned consumables management data from the imaging supply 120. The printer is allowed (e.g., instructed and/or enabled) to print using the unsigned consumables management data (block 222) by, for example, the processor 130 using the unsigned consumables management data to create a consumables gauge, to monitor the yield of the imaging supply 120, to render a desired color, to heat a component (e.g., the fuser 118) of the printer 100 to a threshold temperature and/or to heat the component (e.g., the fuser 118) to the threshold temperature at a threshold rate and/or within a threshold time frame.

If authorization is not obtained to use the unsigned consumables management data, the printer is enabled to print without using the unsigned consumables management data (block 224) by, for example, the processor 130 using default settings stored on the data storage device 126 that, for example, cause the processor 130 to heat a component (e.g., the fuser 118) of the printer 100 to a threshold default temperature and/or to heat the component (e.g., the fuser 118) to the threshold default temperature at a threshold default rate and/or within a threshold default time frame. In some examples, if authorization is not obtained to use the unsigned consumables management data, the printer 100 may be unable print and/or to create and/or cause a consumables gauge to be displayed on the display 110, for example.

As shown in FIG. 3, if the signed data is present on the imaging supply, the program obtains a digital signature (block 302) by, for example, the processor 130 interacting with the example imaging supply 120 to obtain, access and/or read the information (e.g., data) stored on the first memory 122, the second memory 124 and/or the third memory 125 to obtain a digital signature and/or other authenticating and/or security information from the imaging supply 120. The program determines if the obtained digital certificate is authentic (block 304) by, for example, the processor 130 comparing the obtained digital signature and/or other authenticating and/or security information to other information to determine if the obtained digital signature and/or other authenticating and/or security information is authentic and/or the processor 130 performs other processing to authenticate the imaging supply 120. The information to which the obtained digital signature and/or other authenticating and/or security information is compared may be stored at the data storage device 126 and/or any other location local and/or remote to the printer 100.

The program determines if dynamic part data is present on the imaging supply (block 306) by, for example, the processor 130 interacting with the example imaging supply 120 to obtain, access and/or read the information (e.g., data) stored on the second memory 124 to determine if the imaging supply 120 contains dynamic part data. In some examples, the dynamic part data causes the processor 130 to add at least one imaging supply identifier to the compatible-imaging supplies data stored on and/or associated with the printer 100. In some examples, the dynamic part data causes the processor 130 to remove at least one imaging supply identifier from the compatible-imaging supplies data stored on and/or associated with the printer. In some examples, the dynamic part data causes the processor 130 to use the imaging supply 120 even if the model number and/or other identifying information of the imaging supply 120 is not present in the compatible-imaging supplies data.

If dynamic part data is present, the program determines if the dynamic part data causes the printer to add or remove a model type(s) from the printer accepted model types (block 308) by, for example, the processor 130 interacting with the example imaging supply 120 to obtain, access and/or read the information (e.g., data) stored on the second memory 124 to determine if the imaging supply 120 contains dynamic part data that causes at least one type of imaging supply identifier to be added to and/or removed from the compatible-imaging supplies data. If the dynamic part data does not cause the printer to add or remove a model type(s) from the printer accepted model types, the imaging supply is identified as a one-time-use imaging supply (block 310) by, for example, the processor 130 enabling the imaging supply 120 to be used by the printer 100 even though the imaging supply 120 is not included in and/or listed on the compatible-imaging supplies data.

However, if the dynamic part data causes the printer to add or remove a model type(s) from the printer accepted model types, a model type(s) is added and/or removed from the accepted model types based on the dynamic part data (block 312) by, for example, the processor 130 interacting with the example imaging supply 120 to obtain, access and/or read the information (e.g., data) stored on the second memory 124 and, based on the dynamic part data stored on the second memory 124, the processor 130 causes at least one type of imaging supply identifier to be added to and/or removed from the compatible-imaging supplies data stored at, for example, the data storage device 126.

The program obtains a model type from the imaging supply (block 314) by, for example, the processor 130 interacting with the example imaging supply 120 to obtain, access and/or read the information (e.g., data) stored on the third memory 125 to obtain the model type and/or another identifier of the imaging supply 120. The obtained model type is compared to printer accepted model types (block 316) by, for example, the processor 130 comparing the obtained model and/or the imaging supply type to compatible-imaging supplies data stored at, for example, the data storage device 126. The program determines if the obtained model type is one of the printer accepted model types (block 318) by, for example, the processor 130 determining if the obtained model type and/or the imaging supply type is included in the compatible-imaging supplies data.

The consumables management data is obtained from the imaging supply (block 320) by, for example, the processor 130 interacting with the example imaging supply 120 to obtain, access and/or read the information (e.g., data) stored on the second memory 124 to obtain signed consumables management data from the imaging supply 120. The printer is enabled to print using the signed consumables management data (block 322) by, for example, the processor 130 using the signed consumables management data to create a consumables gauge, to monitor the yield of the imaging supply 120, to render a desired color, to heat a component (e.g., the fuser 118) of the printer 100 to a threshold temperature and/or to heat the component (e.g., the fuser) to the threshold temperature at a threshold rate and/or within a threshold time frame.

The program of FIG. 4 begins by receiving an imaging supply at a printer (block 402) by, for example, the imaging supply 120 being inserted into and/or coupled to the printer 100 and the controller 108 and/or the processor 130 identifying the presence of the imaging supply 120. The program obtains data from the imaging supply (block 404) by, for example, the processor 130 interacting with the example imaging supply 120 to obtain, access and/or read the instructions (e.g., data) stored on the first memory 122, the second memory 124 and/or the third memory 125. In some examples, the data includes consumables management data and/or color management data. In response to the data being obtained, the program dynamically defines at least one of printer functional data and imaging supply data (block 406) by, for example, the processor 130 using the data to create a consumables gauge, to monitor the yield of the imaging supply 120, to render a desired color, to heat a component (e.g., the fuser 118) of the printer 100 to a threshold temperature and/or to heat the component (e.g., the fuser 118) to the threshold temperature at a threshold rate and/or within a threshold time frame.

Figure 5:
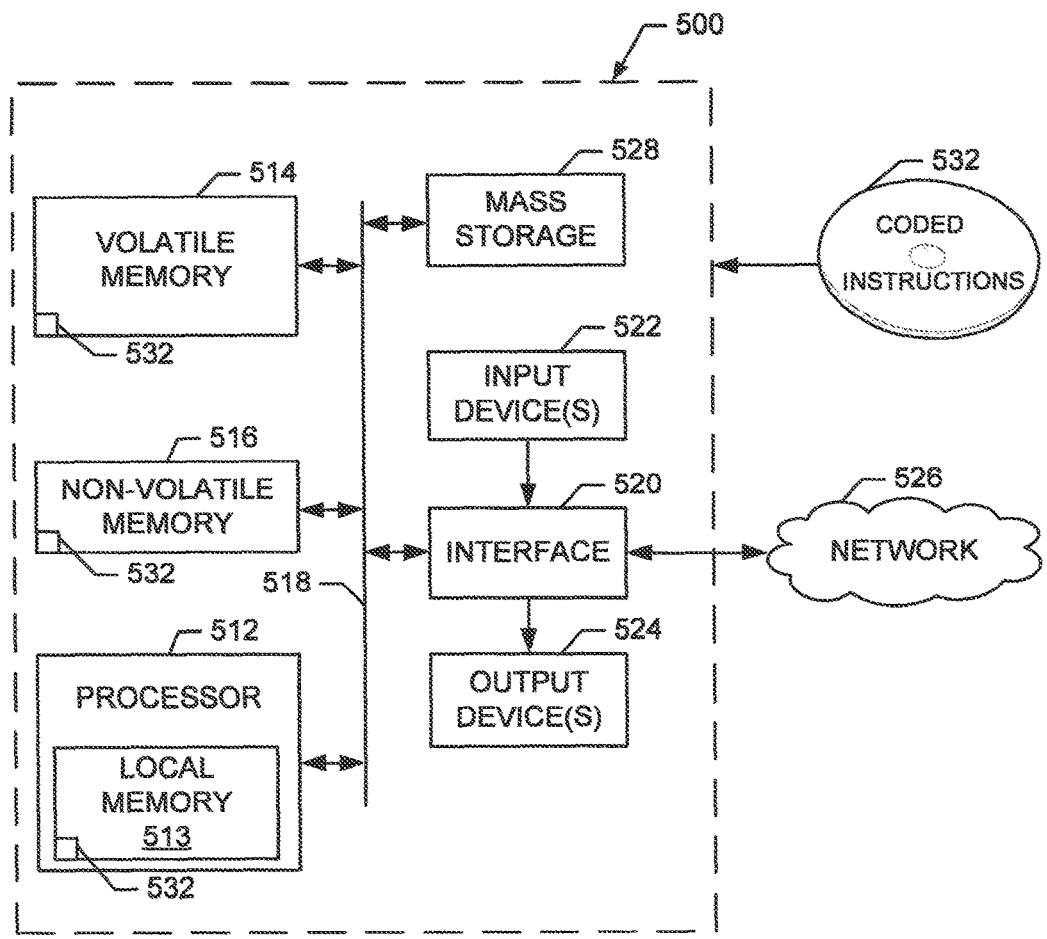
FIG. 5 is a processor platform to execute the example instructions of FIGS. 2, 3 and 4 to implement the printer of FIG. 1.

FIG. 5 is a block diagram of an example processor platform 400 capable of executing the instructions of FIGS. 2, 3 and 4 to implement the printer 100 of FIG. 1. The processor platform 500 can be, for example, a server, a personal computer, a mobile device (e.g., a cell phone, a smart phone, a tablet such as an iPad™), a personal digital assistant (PDA), an Internet appliance, or any other type of computing device.

The processor platform 500 of the illustrated example includes a processor 512. The processor 512 of the illustrated example is hardware. For example, the processor 512 can be implemented by at least one of integrated circuits, logic circuits, microprocessors or controllers from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, at least one input device 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 524 is also connected to the interface circuit 420 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes at least one mass storage device 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIGS. 2, 3 and 4 may be stored in the mass storage device 528, in the volatile memory 514, in the non-volatile memory 516, and/or on a removable tangible computer readable storage medium such as a CD or DVD.

From the foregoing, it will be appreciated that the above disclosed methods, apparatus and articles of manufacture relate to example printers such as laser printers and/or example imaging supplies for use with example printers. In some examples, imaging supplies include security functions, such as, for example, hardware and/or a digital signature. In some examples where the example imaging supplies include a digital signature, data may be recovered from the digital signature.

The examples disclosed herein relate to imaging supplies and/or cartridges that include data that enable the imaging supplies to self-define consumables management data, part acceptability and/or the capacity and/or behavior of the imaging supplies and/or the printer when such imaging supplies are coupled to the printer. The examples disclosed herein enable consumables management data to be defined by the imaging supplies and/or cartridges using signed data (e.g., authenticated data) and/or unsigned data (e.g., unauthenticated data).

In some examples, when a printer (e.g., printer platform) is produced, the printer includes a set number of imaging supplies having a pre-defined capacity and a pre-defined toner low/out messaging level. The capacity and/or toner low/out messaging level for the imaging device is stored on the printer. Thus, in some of these examples, the supported imaging supplies data included on the printer at the time of manufacturing is fixed during the lifetime of the printer, thereby restricting the ability of the printer to adjust to changing market conditions including preventing the introduction of new imaging supplies, preventing the introduction of imaging supplies having a different yield and/or preventing the introduction of imaging supplies that behave differently.

In some examples, the example imaging supplies disclosed herein include a digital certificate having a dynamic consumables management function and a dynamic part function. In some examples, the dynamic consumables management function and the dynamic part function are stored independently on the imaging supply. However, in other examples, the consumables management function and the dynamic part function are not stored independently (e.g., stored in the same or a similar location). In some examples, the dynamic part function is included, contained and/or associated with the digital signature to prevent and/or substantially prevent unauthorized modification of an accepted cartridge list (e.g., supported-imaging supplies; consumables management data) for the printer. In some examples, the consumables management function defines the yield of the imaging supply, the low and out points of the imaging supply, how to transition from different supply life counting methods and/or how to quantify a developer life of the imaging supply. In some examples, the example imaging supplies include a regionalization filed.

In some examples, when an imaging supply is installed in a printer, the imaging supply can indicate if data are present for a dynamic function and/or if this data, if present, are signed and/or unsigned. In examples in which no data are present for the dynamic function, the printer may be unable to perform consumable life tracking for the imaging supply.

In some examples in which the imaging supply includes unsigned data, the imaging supply may cause the printer and/or another device (e.g., a computer, a computing device) to obtain authorization from a user to use the data relating to the dynamic function. When the printer obtains authorization to use the unsigned data, in some examples, the unsigned data are incorporated into a consumable life tracking processes, etc. of the printer and/or the other device.

In examples in which the imaging supply includes signed data, in some examples, the example printers are able to authenticate the data of the imaging supply as being trusted and the printer may use the data relating to dynamic function for the consumable life tracking processes, etc. In examples in which the imaging supplies includes data relating to dynamic part data, in some examples, the imaging supply causes at least one imaging supply identifier to be added to the supported-imaging supplies and/or the consumables management data, the imaging supply causes at least one imaging supply identifier to be removed from the supported-imaging supplies and/or the consumables management data and/or the imaging supply causes the printer to use the imaging supply even if the imaging supply is not included with the supported-imaging supplies and/or the consumables management data. Put simply, the example imaging supplies disclosed enable increased market flexibility after a printer is manufactured by enabling the imaging supplies to dynamically define how the example printer interacts with the example imaging supplies and/or dynamically define which imaging supplies are compatible with the example printer As set forth herein, an apparatus includes a printer to receive an imaging supply, the printer including a processor, in response to the printer receiving the imaging supply, the processor to obtain data from the imaging supply to enable: consumables management data for the imaging supply to be dynamically defined at the printer by the imaging supply; color management data for the imaging supply to be dynamically defined at the printer by the imaging supply; or an identification of unsigned data, limited or no data, or signed data on the imaging supply, when the imaging supply includes unsigned data or limited or no data, the processor is to enable the usage of the imaging supply during a printing operation of the printer.

In some examples, based on the consumables management data, the processor is to dynamically define a yield of the imaging supply. In some examples, based on the color management data, the processor is to dynamically define a rendering of a color. In some examples, based on the color management data, the processor is to dynamically control the printer. In some examples, dynamically controlling the printer includes defining a threshold temperature to which a fuser of the printer is to be heated during a printing operation. In some examples, dynamically controlling the printer includes defining a rate at which a threshold temperature of a fuser of the printer is attained during a printing operation.

In some examples, the imaging supply is a first imaging supply, in response to the printer receiving the imaging supply, the processor is to obtain the data from the imaging supply to cause the printer to: add a second imaging supply to compatible-imaging supplies data of the printer, the compatible-imaging supplies data defining imaging supplies that are usable by the printer; or remove a third imaging supply from the compatible-imaging supplies data. In some examples, the first imaging supply and the second imaging supply are the same imaging supply.

In some examples, in response to processor receiving an identification of signed data on the imaging supply, the processor is to cause the printer to enable the usage of the imaging supply including signed data during a printing operation. In some examples, the imaging supply including signed data is absent from compatible-imaging supplies data, the compatible-imaging supplies defining imaging supplies that are usable by the printer.

An example apparatus includes an imaging supply including a first memory and a second memory, the first memory storing an indication of unsigned data or signed data being stored at the second memory, the second memory storing data, such as, for example, consumables management data or color management data, when the imaging supply is coupled to a printer and consumables management data are stored on the second memory, the consumables management data to cause the printer dynamically define a yield of the imaging supply, when the imaging supply is coupled to the printer and color management data are stored one the second memory, the color management data to cause the printer to dynamically define a rendering of a color, to dynamically define a threshold temperature to which a fuser of the printer is to be heated during a printing operation, or dynamically define a threshold temperature to which a fuser of the printer is to be heated during a printing operation. In some examples, the first memory is different from the second memory.

An example method includes receiving an imaging supply at a printer; obtaining data from the imaging supply; in response to the data being obtained, dynamically defining consumables management data for the imaging supply at the printer, or dynamically defining color management data for the imaging supply at the printer. In some examples, the method includes, in response to the data obtained, identifying the data as signed data or unsigned data. In some examples, the method includes enabling a printing operation to be performed using the imaging supply when the imaging supply includes unsigned data.

An examples apparatus includes an imaging supply including a first memory and a second memory, the first memory storing an indication of at least one of unsigned data, signed data, and limited or no data being stored at the second memory, when at least one of unsigned and signed data are present on the second memory, the second memory storing consumables management data, when the imaging supply is coupled to a printer and consumables management data are stored on the second memory, the consumables management data to cause the printer to dynamically define at least one of a yield, a low point, and an out point of the imaging supply. In some examples, the first memory is different from the second memory. In some examples, the apparatus includes a third memory storing an imaging-supply identifier, when the imaging supply is coupled to the printer, the printer to use the imaging-supply identifier to determine if the imaging-supply identifier is included on compatible-imaging supplies data, the compatible-imaging supplies data defining imaging supplies that are usable by the printer. In some examples, when at least one of unsigned and signed data are present on the second memory, the second memory stores color management data, the color management data to cause the printer to dynamically define a rendering of a color. In some examples, when limited or no data are present at the second memory, and the imaging supply is coupled to the printer, the printer to use default settings for at least one of consumables management data and color management data. In some examples, the second memory stores dynamic part data and the imaging supply is a first imaging supply, when the imaging supply is coupled to the printer, the dynamic part data to at least one of add a second imaging supply to compatible-imaging supplies data of the printer, the compatible-imaging supplies data defining imaging supplies that are usable by the printer, and remove a third imaging supply from the compatible-imaging supplies data.

An example method includes receiving an imaging supply at a printer; obtaining data from the imaging supply; and in response to the data being obtained, dynamically defining printer functional data including at least one of consumables management data for the imaging supply at the printer, color management data for the imaging supply at the printer, and a temperature profile of a fuser of the printer. In some examples, the method also includes in response to the data obtained, identifying the data as signed data or unsigned data. In some examples, the method also includes performing a printing operation using the imaging supply when the imaging supply includes unsigned data. In some examples, dynamically defining color management data includes dynamically defining a rendering of a color. In some examples, the imaging supply is a first imaging supply, further including, in response to the data obtained from the imaging supply, at least one of adding a second imaging supply to compatible-imaging supplies data of the printer, the compatible-imaging supplies data defining imaging supplies that are usable by the printer, and removing a third imaging supply from the compatible-imaging supplies data.

An example apparatus includes a printer to receive an imaging supply, the printer including a processor, in response to the printer receiving the imaging supply, the processor to obtain data from the imaging supply to identify a presence of unsigned data, limited or no data, or signed data on the imaging supply, when the imaging supply includes at least one of unsigned data and limited or no data, the processor is to use the imaging supply during a printing operation of the printer. In some examples, based on the data, the processor is to identify the presence of at least one of consumables management data on the imaging supply and color management data on the imaging supply, the consumables management data for the imaging supply to be dynamically defined at the printer by the imaging supply, the color management data for the imaging supply to be dynamically defined at the printer by the imaging supply. In some examples, based on the consumables management data, the processor is to dynamically define at least one of a yield, a low point, and an out point of the imaging supply. In some examples, based on the color management data, the processor is to dynamically define a rendering of a color.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. An article for an imaging supply for a printer, comprising a memory having:
   a first part storing an indication that unsigned data is stored in the memory; and
   a second part different from the first part storing the unsigned data.

2. The article of claim 1, where the unsigned data includes consumables management data.

3. The article of claim 1, where the unsigned data includes compatibility imaging supply data.

4. The article of claim 1, where the first part of the memory and the second part of the memory are logical parts of a single physical memory.

5. The article of claim 1, where the first part of the memory and the second part of the memory are physical parts of a memory having multiple physical parts.

6. An article for an imaging supply for a printer, comprising a memory having:
- a first part storing an indication that a digital signature to authenticate the imaging supply to the printer is stored in the memory; and
- a second part different from the first part, storing the digital signature.

7. The article of claim 6, where the second part of the memory stores consumables management data.

8. The article of claim 7, where consumables management data is part of the digital signature.

9. The article of claim 6, where the memory includes a third part different from the first and second parts, storing consumables management data.

10. The article of claim 9, where the digital signature flags the consumables management data in the third part of the memory.

11. The article of claim 6, where the second part of the memory stores compatible imaging supply data.

12. The article of claim 6, where the memory includes a third part different from the first and second parts, storing compatible imaging supply data.

13. The article of claim 6, where the second part of the memory stores consumables management data and compatible imaging supply data.

14. The article of claim 6, where the memory includes a third part different from the first and second parts, storing consumables management data and compatible imaging supply data.

15. The article of claim 6, where the first part of the memory and the second part of the memory are logical parts of a single physical memory.

16. The article of claim 6, where the first part of the memory and the second part of the memory are physical parts of a memory having multiple physical parts.

17. An article for an imaging supply for a printer, comprising:
- a first memory and a second memory;
- the first memory storing an indication that unsigned data or signed data is stored on the second memory; and
- the second memory storing consumables management data to cause the printer to define at least one of a yield, a low point, or an out point of the imaging supply.

18. The article of claim 17, where:
- the first memory is logically different from the second memory; or
- the first memory is physically different from the second memory.

19. The article of claim 17, comprising a third memory storing an imaging supply identifier for the printer to use to determine if the imaging supply identifier is included on compatible imaging supplies data defining imaging supplies that are usable by the printer.

20. The article of claim 17, where the second memory stores color management data to cause the printer to define a rendering of a color.

21. The article of claim 17, where the second memory stores part data for a first imaging supply to cause the printer to add a second imaging supply to the printer's compatible imaging supplies data and/or to remove a third imaging supply from the printer's compatible imaging supplies data.

22. The article of claim 21, where the first imaging supply is different from the second imaging supply.

* * * * *